United States Patent [19]

Scarrott

[11] 4,355,408
[45] Oct. 19, 1982

[54] SYSTEM FOR EXTRACTING TIMING INFORMATION FROM A DIGITAL WAVEFORM

[75] Inventor: Gordon G. Scarrott, Welwyn Garden City, England

[73] Assignee: International Computers Limited, Stevenage, England

[21] Appl. No.: 233,451

[22] Filed: Feb. 11, 1981

[30] Foreign Application Priority Data

Feb. 13, 1980 [GB] United Kingdom ............... 8004793

[51] Int. Cl.$^3$ .................................................. H04L 7/00
[52] U.S. Cl. ......................................... 375/110; 360/51
[58] Field of Search ........................... 375/4, 106, 110; 328/63, 72; 360/51

[56] References Cited

U.S. PATENT DOCUMENTS 3,019,296  1/1962  Schelleng .............................. 375/4
4,312,075  1/1982  Murano et al. ...................... 375/106

Primary Examiner—Jin F. Ng
Attorney, Agent, or Firm—Lee, Smith & Jager

[57] ABSTRACT

System for extracting timing information from a digital waveform supplied to the system in which the waveform is modulated by a modulator, passed through a surface acoustic wave transversal filter and demodulated by a demodulator. Zero crossings in the resultant transformed waveform are detected by a detector and used to determine the times at which another version of the original waveform is sampled by a sampling circuit.

The characteristics of the surface acoustic wave transversal filter are chosen to be such that each elementary pulse in the original waveform is transformed into an oscillatory waveform, the zero crossings of the different oscillatory waveforms coinciding with one another and defining the sampling times.

10 Claims, 12 Drawing Figures

SYSTEM FOR EXTRACTING TIMING INFORMATION FROM A DIGITAL WAVEFORM

BACKGROUND TO THE INVENTION

This invention relates to digital information signals, and in particular to systems in which timing information is to be extracted from a digital signal.

A digital signal normally represents digital information by the value of the signal at set times. In interpreting the signal those times must be known. In many systems they are defined by a separate clock signal which is used both by the apparatus that creates the signal and by the apparatus that responds to it. But in some instances, for example when the digital signal has been subjected to an unknown or variable delay, the relationship between the signal and the original timing information used in generating it is lost. Such delays occur when a digital signal is recorded magnetically and then read back, and in communication over long distances, for example by satellite. It is then desirable to be able to extract the timing information to be used in interpreting the signal from the signal itself. Signals which allow that to be done are often described as "self-clocking".

The channel introducing the delay is often bandwidth limited. Bandwidth limitation introduces distortion and makes recovery of the timing information more difficult. Thus a digital signal which originally consisted of sharply localised elementary signals is changed into one in which the elementary signals are depressed and spread out. If the width of each elementary signal spreads far enough, elementary signals at the minimum separation will overlap and interfere with one another.

Magnetic recording is an illustration of the way that makes recovery of timing information more difficult. The original digital signal consists of a write current in which the elementary signal is a reversal in the direction of the current. There is a minimum separation between reversals, but one reversal is not necessarily followed by another at the minimum separation. Each reversal is recorded on the magnetic medium as a transition between two regions magnetised to saturation in opposite directions and the transition, when read back, produces a bell-shaped read voltage. Now one method of extracting timing information is to detect the peaks of the read signal, on the assumption that each peak indicates the peak of one of these elementary bell-shaped pulses. But if the pulses interfere each peak will be shifted, by a variable amount which depends on whether or not the pulse has neighbours on either side at the minimum separation. Various complicated and unsatisfactory methods have been proposed to compensate for this peak shifting.

SUMMARY OF THE INVENTION

This invention provides a method of extracting timing information from an original waveform representing digital information and composed of elementary signals, the method comprising transforming the waveform into a transformed waveform by a step comprising modulating a carrier wave with the original waveform, passing the modulated waveform through a surface acoustic wave transversal filter and demodulating the output of the filter, the characteristics of the surface acoustic wave transversal filter being such as to transform an isolated elementary signal in the original waveform into an elementary transformed waveform which has at least one zero crossing and is substantially zero at each instant at which a zero crossing of any other elementary transformed waveform can occur, and outputting timing signals in response to the detection of zero crossings in the transformed waveform.

The invention also provides apparatus for extracting timing information from an original waveform representing digital information and composed of elementary signals, the apparatus comprising means for transforming the waveform into a transferred waveform, which means comprises in sequence a modulator, a surface acoustic wave transversal filter and a demodulator, and means for detecting zero crossings in the transformed waveform and outputting timing signals in response thereto, the characteristics of the surface acoustic wave transversal filter being as set out in the preceding paragraph.

BRIEF DESCRIPTION OF THE DRAWINGS

Two systems constructed and operating in accordance with the invention will now be described in greater detail by way of example with reference to the accompanying drawings in which.

DESCRIPTION OF THE PREFERRED EMBODIMENTS

Figure 1:
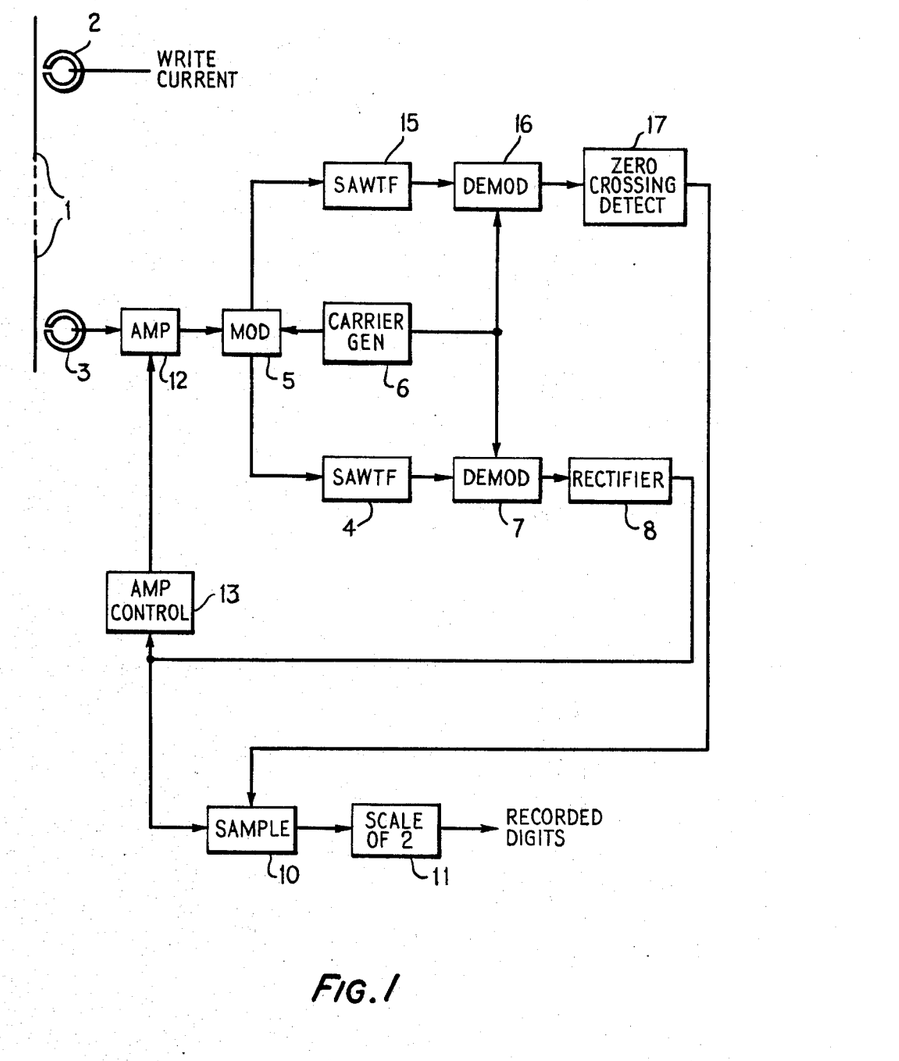
FIG. 1 is a block diagram of the first system.
Figures 2A, 2B:
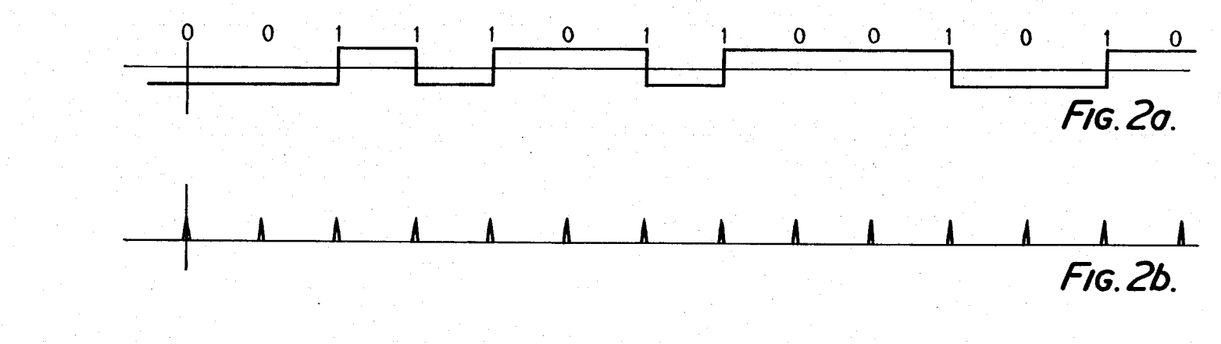
FIG. 2 shows various waveforms relating to the first system.

Referring to FIG. 1, the first system records data on a moving magnetic medium 1. The information is supplied as a write current to a write head 2. The write current (see also FIG. 2a) switches between a positive and a negative value at selected instants. The instants at which it is possible for the current to reverse direction are defined by the pulses of a clock signal, as shown in FIG. 2b. It will be assumed that the information to be recorded is being encoded by a non-return-to-zero encoding in which each of the instants defined by a clock pulse at which a reversal in the current direction takes place represents a 1 and each of the instants at which there is no reversal represents an 0. The binary string represented is therefore that shown above the waveform in FIG. 2a.

The write current, while it is constant, causes the magnetic medium to be magnetised to saturation in one direction, and each reversal in the direction of the current results in a thin transition region between regions magnetised in opposite directions.

Figure 2C:
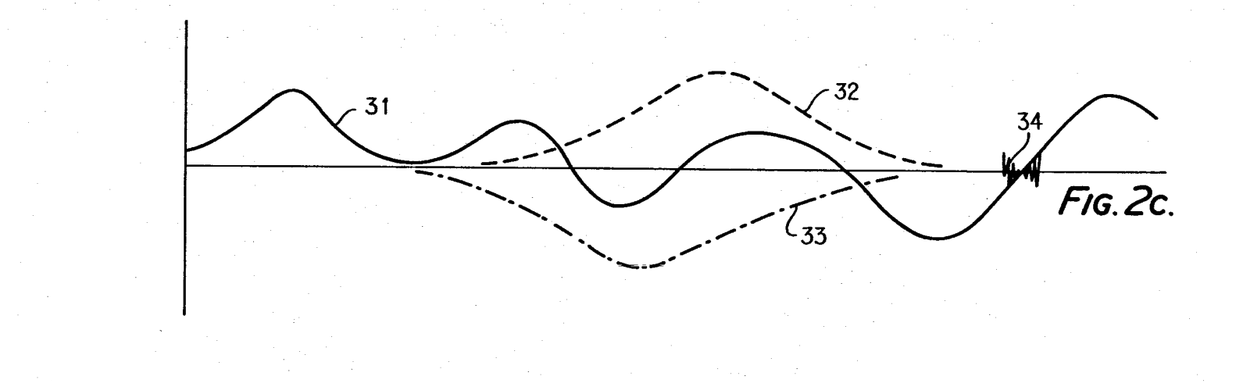

At some arbitrary time after having been recorded the information is read back by a read head 3 which produces a read waveform 31 as shown by the solid line in FIG. 2c. Each of the transition regions on the magnetic region corresponding to a reversal of the write current induces an elementary signal in the read waveform consisting (in this example) of a bell-shaped pulse such as a pulse 32 shown dotted in FIG. 2c, the peak of the pulse being shown aligned with the transition which gave rise to it. FIG. 2c also shows a chain dotted pulse 33 resulting from the preceding transition. The peaks of these pulses are spaced apart at the same intervals as the reversals of the read current giving rise to the pulses, but the pulses are spread out so that neighbouring pulses whose peaks are at the minimum separation (such as the pulses 32 and 33) interfere with one another. The total waveform 31 is substantially the sum of the individual pulses, since the read process is at least to a first approximation linear. But the interference between the individual pulses causes the peaks in the total waveform to be shifted from the peaks of the individual pulses in a way that depends principally on whether or not the corresponding individual pulse has immediately adjacent neighbours on either side. The interference also depresses the peaks, since in this case the pulses must alternate in sign.

In order to overcome the effects of interference the read waveform is passed through a surface acoustic wave transversal filter 4 after having been modulated by a modulator 5 onto a carrier wave from a carrier wave generator 6 to give a modulated waveform 34 as shown at the right-hand end of FIG. 2c. In a surface acoustic wave transversal filter an acoustic wave is launched onto the surface of a piezo-electric crystal by a transducer consisting of a pair of interdigitated metallic combs and is received by another such transducer. In a transversed filter an input waveform is passed through a tapped delay line and the output waveform is the weighted sum of the outputs of the taps. By choosing the delays of the taps and their weighting any required frequency response can be achieved to a desired accuracy free (at the expense of a delay) from the restriction to which conventional filters are subject that the phase and amplitude of the output cannot be tailored independently. The techniques for designing a surface acoustic wave transversal filter to have a desired response are described, for example, in Part 3 of "Surface acoustic filters, design, construction, and use", edited by John Matthews and published by John Wiley and Sons. The principal tool in tailoring the response is the adjustment of the spacing and degree of overlap of the teeth of the transducer combs.

Figure 2D:
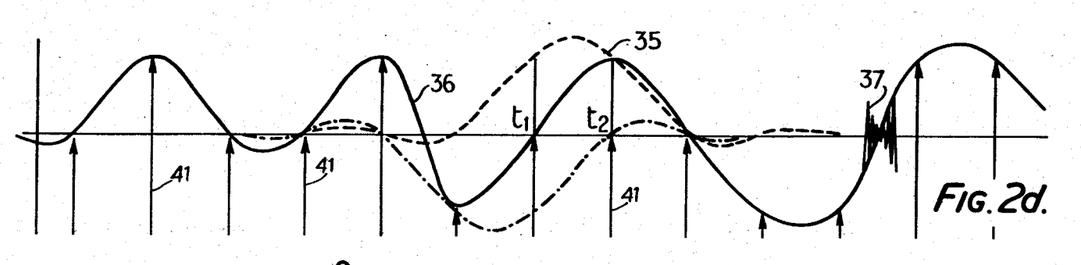
Figure 2E:
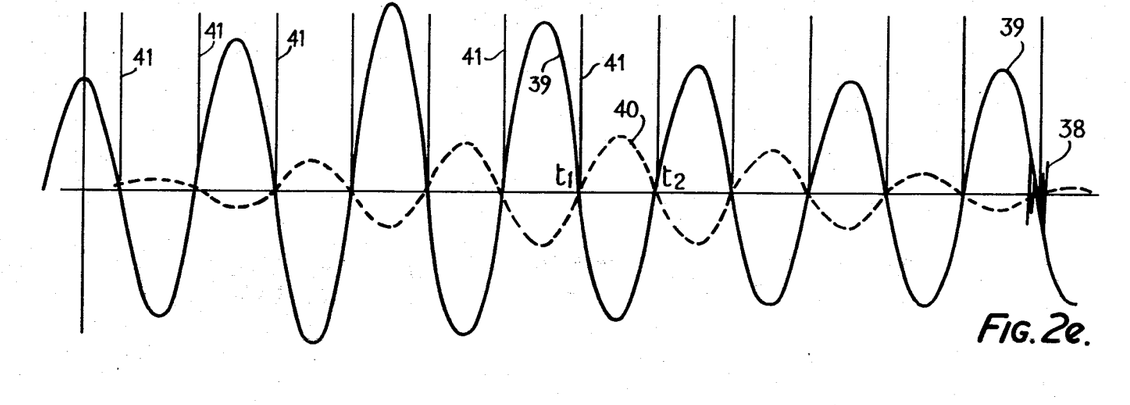

The surface acoustic wave transversal filter 4 is given a response such that the modulated version of an isolated elementary pulse of the read waveform (that is, one free from interfering neighbours) is transformed into a pulse the envelope of which is of the Nyquist 2 shape, such as a waveform 35 shown dotted in FIG. 2d, which is the transformed version of the dotted elementary pulse 32 of FIG. 2c.

In such a pulse the values of the amplitude of the pulse at two points, shown as $t_1$ and $t_2$ in FIG. 2d, are equal, and on either side of the central region containing these two points the pulse oscillates, the distance between neighbouring zero crossings and between $t_1$ and $t_2$ and the nearest zero crossing, being equal to the distance between $t_1$ and $t_2$. The interval between $t_1$ and $t_2$ is called herein the period of the pulse and in this case it is chosen to be equal to the interval between adjacent clock pulses. The derivation of a pulse of the Nyquist 2 shape is described in more detail in our above-mentioned application.

In FIG. 2d the transformed elementary pulse is for convenience shown aligned with the elementary pulse from which it is derived. The points $t_1$ and $t_2$ are therefore shown occurring half a clock interval before and after the reversal that is the source of the pulse.

Because the filter 4 is linear, the envelope of its output is the sum of the envelopes of the individual transformed elementary pulses, as shown in FIG. 2d by a solid line 36, the modulated carrier wave being indicated as 37 at the right. The output is demodulated by a demodulator 7, to give a transformed version of the read waveform, equal to the envelope 36 of the output of the filter 4.

The consequence of tailoring the elementary pulses to the Nyquist 2 shape is to ensure that the amplitude of the transformed read waveform at an instant such as $t_1$ depends only on two possible pulses, the ones (if present) with peaks immediately on either side of that instant. If only one such pulse is present, such as the pulse 35 at $t_2$, the amplitude is non-zero. If both are present, such as the pulse as at $t_1$, the amplitude is zero since the pulses are of opposite sign, the second pulse being a negative pulse 38 shown chain-dotted and corresponding to the pulse 33. The amplitude is not affected by any more distant pulses, even though their total width extends beyond this instant, since they have zero crossings at it.

Therefore, the effects of interference are eliminated (except between immediately neighbouring pulses, where it takes a controlled and deducible form) provided the transformed waveform can be sampled with the clock interval at the points $t_1$, $t_2$ etc. However, although the waveforms on FIG. 2 are shown aligned for convenience, the relationship between the transformed waveform and the original clock pulses is not known. The timing cannot be deduced easily from the peaks in the waveform because they are subject to a variable peak shift depending on whether or not there are immediate neighbours. And the zero crossings in the waveform do not occur at the required instants.

In accordance with this invention the modulated read waveform 34 is passed through a second surface acoustic wave transversal filter 15, to produce a modulate waveform 38 the envelope of which is shown as a waveform 39. The response of the filter 15 is such as to transform an isolated elementary pulse in the read waveform such as the pulse 35 into one the envelope of which has the shape of an elementary waveform 40 shown dotted in FIG. 2e. This pulse is the one which arises from the same written transition as the dotted elementary pulse 35 of FIG. 2d. It is given two primary zero crossings, at $t_1$ and $t_2$, on either side of the peak and further zero crossings equally spaced from them at the clock interval, the total waveform extending over a number of clock cycles. Since all the other elementary pulses in the read waveform occur with corresponding points spaced from it by integral multiples of the clock period, the zero timing crossings of all the transformed pulses coincide. So even though the amplitude of the resulting total timing waveform 39 (which again is the sum of the transformed elementary waveforms) depends on the pattern of pulses, the zero crossings provide reliable timing information.

Care is needed about two aspects. First, the dynamic range of the total timing waveform must not be too great. That implies a limit on the number of elementary timing waveforms that may be superposed, and consequently the number of clock periods covered by one elementary timing waveform. It is also necessary to ensure that at least one elementary timing signal covers each point at which there should be a zero crossing. That implies that (in the encoding considered) arbitrarily large sequences of zeros should not be permitted. Conveniently that can be achieved by the occasional odd-parity bit, for example by quantising the information in eight-bit bytes with a ninth bit used for odd parity.

Secondly, in the example considered, zero crossings may be either positive-going or negative going. A completely random pattern of recorded transitions would lead to as many positive-going as negative-going transitions. It is therefore necessary to adjust the pattern of recorded information to ensure a preponderance of zero crossings in one direction or other at each position.

The use of a parity bit to avoid long strings without transitions is sufficient in itself to improve the situation since every initial bit of a byte is put into a systematic coherent state with the transitions alternating and zero crossings reinforcing so that even if all written combinations occur with equal probability there is still a preponderance of transitions whose relative positions would create a well defined timing wave form. But additional security may be provided by taking advantage of the fact that in any practicable scheme the use of the various symbols is far from uniform. For example, if (with an English-language text) alphabetic information is recorded the frequencies of letters such as E and other vowels, S and T are enormously higher than the frequency of Z. The codes are therefore chosen so that the byte symbols which are used most frequently generate a timing wave form of the same sign as that which is encouraged by the use of the parity bit. The numeric symbols 0–9 are used with approximately uniform probability but there is only ten of them required out of a total repertoire of the 256 available symbols. The coding therefore ensures that all the numeric symbols produce timing waveforms of the same sign.

The output of the filter 15 is demodulated by a coherent demodulator 16 to extract the waveform 39 and passed to a zero-crossing detector 17, which produces a signal 41, shown as an arrow on FIGS. 2d and e, each time there is a zero crossing in the timing waveform. The output of the zero-crossing detector constitutes timing information extracted from the original read waveform.

After the output of the filter 4 has been demodulated it is rectified by a rectifier 8, (or rectification and demodulation may be combined). The peak output of the rectified waveform is maintained substantially constant by a feedback loop controlling an amplifier 12 for the read waveform from an amplifier control circuit 13. The output of the rectifier 12 is also passed to a sampling circuit 10, which receives the timing signal from the zero detector 17 and causes the rectified output to be sampled in response to each detected zero crossing of the timing waveform. That produces a digital signal which is passed to a scale-of-two circuit 11 which changes its output each time it receives a 1 and leaves it unchanged each time it receives a 0. This results in the recovery of the original recorded digits.

The complete system is very simple and its timing accuracy is essentially printed into the timing waveform filter. It offers a very high information density, since the recorded transitions may be compressed together to the point at which considerable interference takes place and yet still be recovered. All the required timing information is obtained directly from the waveform to be analysed.

The two surface acoustic wave transversal filters may be implemented on a single crystal using a common input transducer, taking advantage of the fact that the transducer inevitably generates signals travelling in both directions.

Of course, the timing signals derived as described can be used to analyse a waveform which has not been transformed into the Nyquist 2 type. The waveform to be analysed need not be even transformed by a surface wave acoustic filter corresponding to the filter 4. In suitable circumstances the timing signals can be used to synchronise a separate oscillator, although that introduces the possibility of error and loses the advantage that all the required timing information is derived from the incoming waveform.

A separate or auxilliary oscillator may be used in circumstances in which there are phase reversals in the transformed total waveform brought about by changes in the dominant zero-crossing direction of the superimposed transformed elementary waveforms. In that case the amplitude of the transformed total waveform will be small in the neighbourhood of each phase change and the zero-crossing detection may be less reliable. The auxilliary oscillator may then be used as the source of timing information when the peaks of the transformed waveform are below a threshold, and the zero-crossings may be used as the source of timing information, and also to resynchronize the auxilliary oscillator, when the peaks are above the threshhold.

Multiple timing filters may be used to give interleaved clock signals. The original data may represent data in other ways, for example by unipolar or bipolar pulse codes.

The second system is also a magnetic recording system. It is assumed that during recording the transitions are written on the medium as closely as possible and that it is desired to increase the density with which information is recorded over that achieved by recording each source digit by a transition or the absence of a transition.

The information to be recorded is first divided into blocks, and each incoming block of n source digits is encoded into m digits, where m is greater than n. The encoding is chosen to meet the requirement that no two consecutive digits of the encoded stream are each represented when recorded by a transition. Such an encoding is referred to herein as a "non-consecutive-ones encoding", since using the non-return-to-zero method of recording the digits explained with reference to the first system it is equivalent to the requirement that there are no consecutive 1s in the stream of encoded digits to be recorded.

If 1s may be separated by only one 0, transitions on the magnetic medium will never be closer than two digit period; therefore for a given minimum separation between transitions the digit spacing may be halved as compared to the case where the encoded source data containing consecutive 1s is recorded directly. Consequently there will be an increase in recording density provided m is less than 2n.

Two suitable examples are when $n=3$, $m=5$ and $n=5$, $m=8$. The first case arises because a five-digit encoded block allows seven combinations which do not have consecutive 1s (including between one block and the next). Since eight combinations will encode all the possible combinations of three source digits n may be 3 for m equal to 5. Therefore since the digit spacing of the encoded data is halved on recording, three source digits are recorded in the space required by $2\frac{1}{2}$ source digits if recorded directly, increasing the recording density by a factor of 1.2.

The second case, however, is the preferred one. Eight encoded digits provide 34 permissible combinations, of which 32 are sufficient to encode a five digit source block. Hence, given the halved digit spacing on recording, five source digits are recorded in the space required by four source digits if recorded directly, increasing the recording density by a factor of 1.25. In addition, one of the two combinations that may be dispensed with can be chosen to be the all-zero case. That ensures that in any encoded block there is at least one 1, allowing the encoded data to be self clocking. The assignment of the chosen 32 combinations of encoded digits to the possible combinations of source digits may be carried out in any desired manner.

Other possibilities with a minimum of one 0 between neighbouring 1s and halved digit spacings are $n=6$, $m=10$ and $n=8$, $m=13$. And other analogous encodings may be carried out in which the encoded 1s are separated by a minimum of more than one 0. In that case the digit spacing of the recorded data may be correspondingly reduced by a greater amount.

Figure 3:
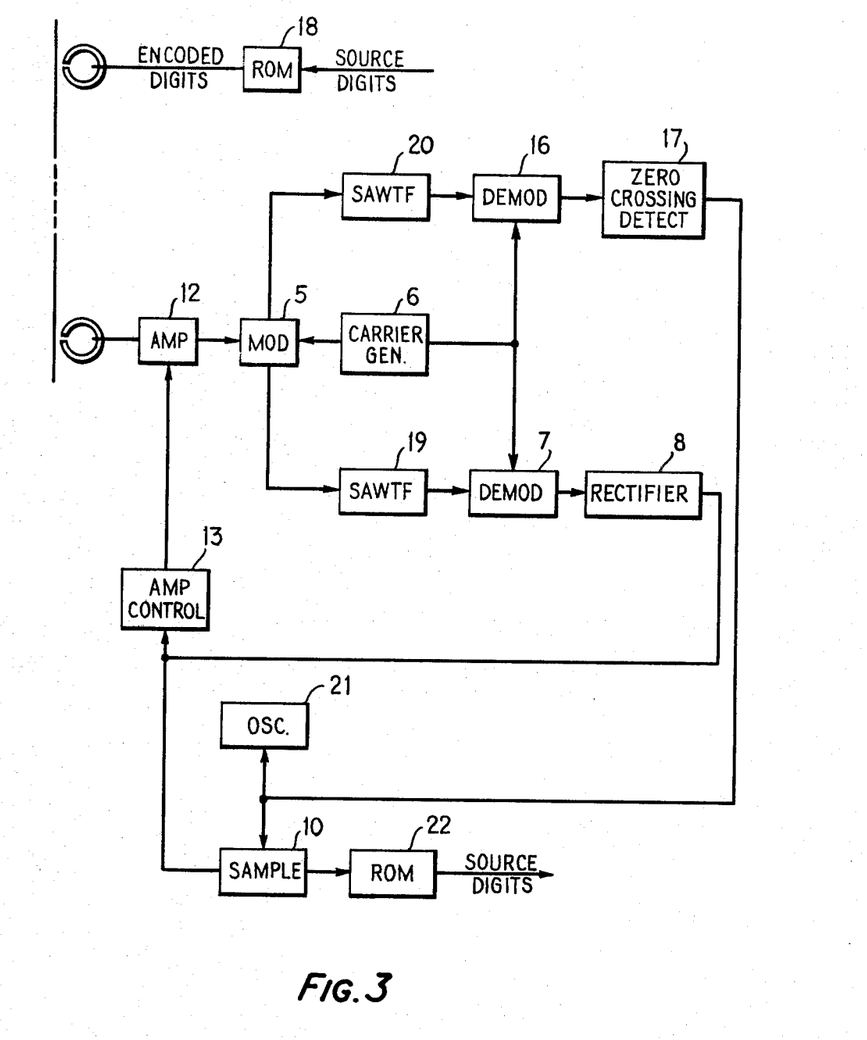
FIG. 3 is a block diagram of the second system.
Figure 4A:
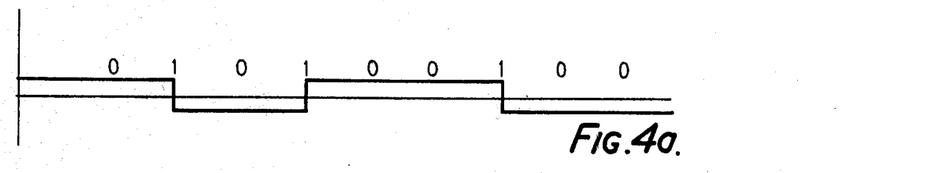
FIG. 4 shows various waveforms relating to the second system.
Figure 4B:
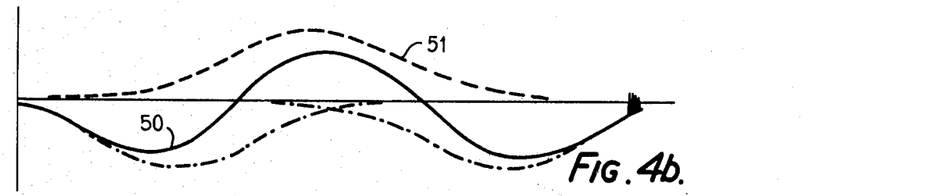

Referring to FIG. 3, the system is similar in outline to the first system and similar parts are given the corresponding reference numerals. But the incoming digits are first encoded as explained by being used to address a look-up table in a read-only memory 18, the output of which is supplied digit by digit to the write head 2, as shown in FIG. 4a. The non-consecutive-ones encoding of the source data is shown above the waveform. The read waveform 50, as shown by the solid line in FIG. 4b, is made up of elementary pulses resulting from individual transitions as explained with reference to the first system. One such pulse, a pulse 51 derived from the transition above its peak, is shown dotted, and additional such pulses are shown chain-dotted. There are two surface acoustic wave transversal filters 19 and 20, the first of which is designed to have a response which transforms an elementary pulse in the read waveform derived from an isolated transition into a pulse whose shape is the product of a Nyquist 1 curve and a Nyquist 2 curve, both of a period equal to twice the digit spacing. The Nyquist 1 curve has a peak and oscillates on either side of it, the zero crossings being equally spaced from the peak and each other by the period of the curve. The transformed elementary pulse, as shown by the dotted curve 52 in FIG. 4c below the untransformed pulse 51 in FIG. 4b giving rise to it, has a peak shown aligned with the peak of the source pulse 51 and then, on either side, zero crossings separated from one another at one digit period intervals, starting two digit periods from the peak 53. The total transformed waveform 53 made-up from the superposition of the transformed elementary pulses is shown solid in FIG. 4c.

The second surface acoustic wave transversal filter, 20, is designed to have a response which transforms an elementary pulse in the read waveform, derived from an isolated transition, into an elementary timing waveform which is the product of a Nyquist 2 curve whose period is twice the digit period and a sine wave (shown dotted in FIG. 4e) whose zero is at the instant of the peak of the Nyquist 2 curve and whose period is four times the digit period. The elementary timing waveform 54 derived from the dotted elementary read pulse 51 of FIG. 4b is shown dotted in FIG. 4d. It will be seen that it has a primary zero crossing at a time $t_3$ shown aligned with the original transition and is antisymmetric with further zero crossings at digit-period intervals starting two digit periods from the primary zero crossing.

The two surface acoustic wave transversal filters 19 and 20 may, as in the first system, be combined to have a common input transducer.

Carrier modulation and demodulation and rectification of the transformed waveform 53 take place as described in the first system. The modulated carriers are again shown on the right of the figure.

Figure 4C:
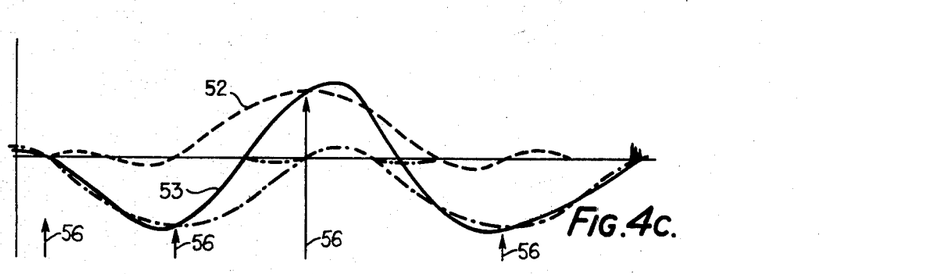
Figure 4D:
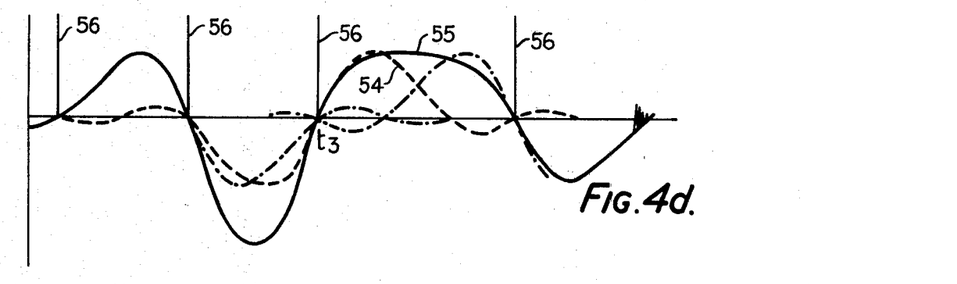
Figure 4E:
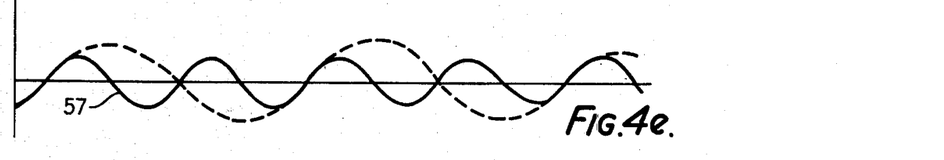

The total timing waveform 55, which is shown solid in FIG. 4d, is passed to the zero detector 17, which produces a signal 56 each time there is a zero crossing in the timing waveform. The resulting signals are again used to determine the instants at which the transformed waveform from the filter 19 via the rectifier 8 is sampled by the sampling circuit 10.

Each transformed elementary pulse such as the pulse 52 of FIG. 4c is non-zero at its peak, and zero at each peak of any other possible pulse, given the non-consecutive-ones encoding. Therefore the total waveform 53 is always non-zero when a peak resulting from a transition is expected. That point will always be sampled, since the primary zero crossing of the corresponding elementary timing waveform occurs then, and any overlapping timing waveforms are also (given the encoding scheme) zero. But the non-zero values possible one digit period away from each peak and spurious zeros in the sampled waveform originating from the superposition of elementary read pulses of opposite sign from transitions separated by two digit periods or from other combinations are ignored. Sampling circuit 10 therefore outputs all the 1s of the encoded data. It also outputs some 0s (see for example the rightmost digit of FIG. 4).

To supply the other 0s a local oscillator 21 is phase synchronised by the output of the zero detector (its output is the solid curve 57 of FIG. 4e) to enable the blocks of encoded data to be counted correctly. Finally the encoded data is decoded by being used to address a look-up table in a read-only memory 22, the output of which is the original source data.

It will be realised that the components of the system described herein which process the signals supplied to and output from the surface acoustic wave transversal filters are all either standard units or are readily constructed using conventional electronic circuitry to perform the function described. They are therefore not described in more detail.

A suitable carrier frequency for the modulation is ten times the bit rate, that is, 50 to 100 megahertz for a bit rate of 5 to 10 million bits per second.

I claim:

1. A method of extracting timing information from an original waveform representing digital information and composed of elementary signals, the method comprising transforming the original waveform into a transformed waveform by the steps of modulating a carrier wave with the original waveform, passing the modulated waveform through a surface acoustic wave transversal filter and demodulating the output of the filter to produce said transformed waveform and detecting zero crossings of the demodulated signal, the characteristics of the surface acoustic wave transversal filter being such as to transform an isolated elementary signal in the original waveform into an elementary transformed waveform which has at least one zero crossing and is substantially zero at each instant at which a zero crossing of any other elementary transformed waveform can occur, and outputting timing signals in response to the detection of zero crossings in the demodulated signal.

2. A method as claimed in claim 1, in which in each elementary transformed waveform there are a plurality of zero crossings equally spaced from one another by a predetermined interval, and the pattern of the elementary signals in the original waveform is such that corresponding points of the different signals occur at some or all of a sequence of instants equally spaced from one another by the said interval.

3. A method as claimed in claim 2, in which each elementary transformed waveform extends for a time at least equal to the greatest possible interval between corresponding points on neighbouring elementary signals in the original waveform.

4. A method as claimed in claim 1, in which each elementary transformed waveform is generally antisymmetric and has a central primary zero crossing and, on each side, a sequence of additional zero crossings equally spaced from one another by a predetermined interval, the nearest to the primary zero crossing on each side being spaced from it by an integral multiple greater than one of that interval, and the pattern of the elementary signals in the original waveform is such that corresponding points of the various elementary signals occur at some only of a sequence of instants equally spaced from one another by the said interval, the smallest possible separation between neighbouring elementary signals being such that corresponding points on the neighbouring elementary signals are separated by the said integral multiple of the said interval.

5. A method as claimed in claim 1 further comprising transforming the original waveform into a second transformed waveform by the steps of modulating a carrier wave with the original waveform, passing the modulated waveform through a second surface acoustic wave transversal filter and demodulating the output of the filter and sampling the amplitude of the second transformed waveform in response to the detection of zero crossings in the first-mentioned transformed waveform, the characteristics of the second acoustic wave transversal filter being such as to transform an isolated elementary signal to the original waveform into a second elementary transformed waveform, which second elementary transformed waveform has a non-zero amplitude at one, or a plurality, of the instants, at which it is sampled in response to the detection of a zero crossing in the first transformed waveform, and has a substantially zero amplitude at any other instant at which it is so sampled.

6. Apparatus for extracting timing information from an original waveform representing digital information and composed of elementary signals, the apparatus comprising means for transforming the original waveform into a transformed waveform, which means comprises in sequence a modulator for modulating a carrier wave with the original waveform, a surface acoustic wave transversal filter for passing the modulated waveform and a demodulator for demodulating the filter output to produce said transformed waveform and means for detecting zero crossings of the demodulated signal and outputting timing signals in response thereto, the characteristics of the surface acoustic wave transversal filter being such as in operation to transform an isolated elementary signal in the original waveform into an elementary transformed waveform which has at least one zero crossing and is substantially zero at each instant at which a zero crossing of any other elementary transformed waveform can occur.

7. Apparatus as claimed in claim 6, in which in each elementary transformed waveform there are a plurality of zero crossings equally spaced from one another by a predetermined interval, and the pattern of the elementary signals in the original waveform is such that corresponding points of the differenrt signals occur at some or all of the sequence of instants equally spaced from one another by the said interval.

8. Apparatus as claimed in claim 7, in which each elementary transformed waveform extends for a time at least equal to the greatest possible interval between corresponding points on neighbouring elementary signals in the original waveform.

9. Apparatus as claimed in claim 6, in which each elementary transformed waveform is generally antisymmetric and has a central primary zero crossing and, on each side, a sequence of additional zero crossings equally spaced from one another by a predetermined interval, the nearest to the primary zero crossing on each side being spaced from it by an integral multiple greater than one of that interval, and the pattern of the elementary signals in the original waveform is such that corresponding points of the various elementary signals occur at some only of a sequence of instants equally spaced from one another by the said interval, the smallest possible separation between neighbouring elementary signals being such that corresponding points of the neighbouring elementary signals are separated by the said integral multiple of the said interval.

10. Apparatus as claimed in claim 6 and further comprising means for transforming the original waveform into a second transformed waveform, which means comprise in sequence said modulator, a second acoustic wave transversal filter and a demodulator, and sampling means for sampling the amplitude of the second transformed waveform in response to said timing signals, the characteristics of the second acoustic wave transversal filter being such as in operation to transform an isolated elementary signal in the original waveform into a second elementary transformed waveform, which second elementary transformed waveform has a non-zero amplitude at one, or a plurality, of the instants, at which it is sampled in response to the detection of a zero crossing in the first transformed waveform, and has a substantially zero amplitude at any other instant at which it is so sampled.

* * * * *